June 7, 1960   W. E. RUDISCH   2,939,561
ELECTROMAGNETIC CLUTCH WITH RESILIENT TORQUE TRANSMISSION
Filed Aug. 15, 1958
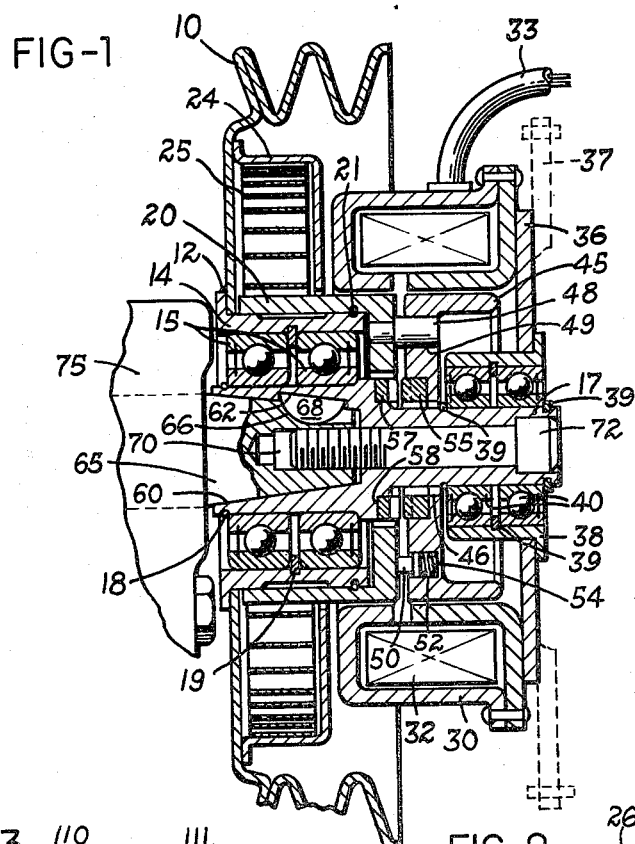
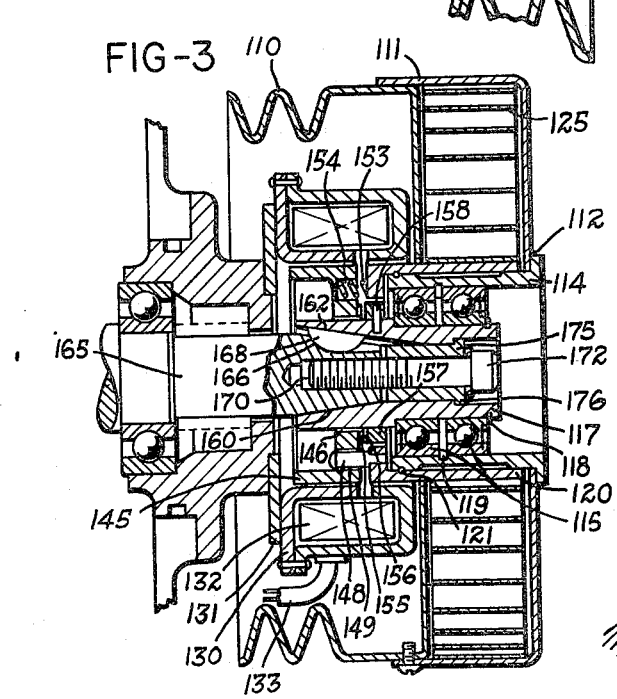
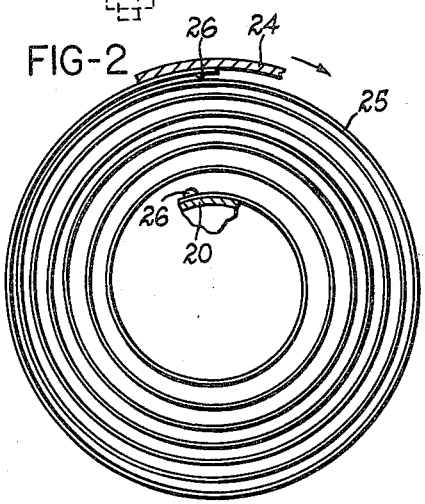
INVENTOR.
WALTER E. RUDISCH
BY
Marechal, Biebel, French & Bugg
ATTORNEYS

United States Patent Office 2,939,561
Patented June 7, 1960

2,939,561

ELECTROMAGNETIC CLUTCH WITH RESILIENT TORQUE TRANSMISSION

Walter E. Rudisch, Dayton, Ohio, assignor, by mesne assignments, to Bendix Aviation Corporation, Detroit, Mich., a corporation of Delaware Filed Aug. 15, 1958, Ser. No. 755,234

5 Claims. (Cl. 192—84)

This application relates to a clutch, particularly to a dog or tooth-type clutch suitable for applications where there is a relatively large difference in inertia and relative rotational speeds between the driving and driven parts to be rotatively connected.

Normally, a dog or tooth-type clutch cannot accommodate a relatively heavy load where there is a relatively high difference in the inertia between the driving and driven parts to be connected, and where there is also a relatively great difference in r.p.m. between the unconnected driving and driven parts. Under some circumstances, it might be possible to use a plurality of relatively small clutch teeth and allow them to disengage or skip initially, but with relatively large differences in inertia of the driving and driven parts the engaging shock usually is too high and this results in wearing of the teeth during engagement. To combat such wear, it is normally necessary to employ special more expensive metals or to strengthen the clutch teeth in some other manner to minimize the additional wear. A clutch as provided by the present invention avoids these difficulties, and is particularly adapted to use with a load having a relatively high inertia, where there is also a substantially great difference in r.p.m. between the load and the rotating drive to the clutch, whereby upon engagement of the clutch teeth or dogs a considerable load may be applied across such teeth, necessary to accelerate the high inertia load.

The primary object of this invention is to provide a clutch which incorporates a resilient torque transmitting member between its input and output, so arranged that upon engagement of the clutch, and consequent resistance at the output due to load inertia, the clutch teeth may be engaged for a few revolutions before the load is applied across the teeth.

Another object of the invention is to provide such a clutch including an electromagnetic operator, wherein the armature member and associated movable clutch teeth may be of relatively light weight and structure, requiring an electromagnet of relatively low power consumption, and which is capable of connecting a load having relatively high inertia to a drive rotating at substantially great speed with respect to the load.

Other objects and advantages of the invention will be apparent from the following description, the accompanying drawings and the appended claims.

In the drawings—

Fig. 1 is a vertical section through a clutch in accordance with the invention, showing a portion of a driven load in elevation, and showing in phantom a suitable support for holding the electromagnet against rotation;

Fig. 2 is a somewhat schematic elevational view of the spiral spring resilient connection between the pulley and input member of the clutch; and Fig. 3 is a vertical section, similar to Fig. 1, through a modified construction of a clutch in accordance with the invention.

Referring to the drawing, which illustrates preferred embodiments of the present invention, in Fig. 1 the input to the clutch is shown as a double groove sheave or pulley 10 which is suitably fixed, as by brazing at 12, to a carrier sleeve 14 which is mounted on the outer races of a pair of ball bearings 15. The inner races of these bearings are in turn mounted on an output member or spindle 17, held in place by a suitable snap ring retainer 18 and separated by a further snap ring retainer 19. Surrounding the carrier 14 is a cup-like input member 20 which is mounted upon the member 14 in freely rotatable relation, and a suitable retaining ring 21 holds member 20 against axial movement relative to member 14.

The drive connection between pulley 10 and input member 20 is provided by a cup-shaped member 24 which is secured to the interior of pulley 10 in a suitable manner, for example by brazing or welding, and a spirally wound band spring 25 is connected at its opposite ends, as by suitable rivets 26 (Fig. 2), to cup 24 and to input sleeve member 20. This arrangement provides a resilient connection of limited travel between the input pulley and input member 20. An electromagnetic clutch operator, including the outer two-piece housing 30 which also functions as a flux field defining member, is supported in surrounding relation to the protruding end of input member 20, and extends axially therefrom. Within housing 30 is supported a field coil 32 having a suitable input connection 33 to an electrical energizing source (not shown). The housing 30 is secured to a mounting plate 36 which in turn may be fastened to further mounting arms 37 for supporting the magnet in proper position. At the center of mounting plate 36 there is a sleeve-like bearing carrier 38 which houses a pair of ball bearings 40, having their inner races received on the output member 17. These bearings are retained in position by suitable snap ring members 39.

The armature or control member 45 is also of generally cup shape, including a central hole or opening 46 through which the output member 17 extends, and this armature is supported by the input member 20 by a plurality of pins 48 (one shown in Fig. 1) which are press fit at one end into input member 20 and received in slidable relation within holes 49 in the armature. These pins thus provide, in addition to a mounting, a spline-like driving connection between input member 20 and armature 45. The armature member also carries suitable release pins 50 which are carried in suitable bore holes 52 within the face of the armature, and positioned over biasing springs 54 which urge the pins 50 against the face of input member 20, biasing the clutch to a normally disengaged position.

The clutching parts per se include a toothed input member 55 which is suitably secured in the face of armature 45, and a mating toothed output tooth member 57 which is suitably secured against a shoulder 58 on the output member 17. Thus, when the electromagnetic operator is energized, the armature will move to the left as viewed in Fig. 1, against the bias of springs 54, and the tooth members 55 and 57 will be engaged to provide the requisite drive connection.

The output member 17 includes a tapered bore 60 provided with a key slot 62, and which may receive a complementary tapered shaft 65 of a load to be driven. This shaft 65 includes a conventional keyway 66 for receiving the driving key 68, and further includes tapped bore 70 at its outer end which receives the bolt 72 extending through output member 17 to retain these parts in driving relation.

Shaft 65 is shown as connected to a suitable output load 75 which may be, for example, a positive displacement compressor, or pump, or other load device to be driven, having a relatively great inertia. Thus, assuming that the input pulley 10 is being constantly driven, and that the clutch is disengaged, when it is desired to drive the load the electromagnetic operator is energized through a suitable control (not shown), causing armature 45 to shift to the left and engage the clutch teeth. Due to the relatively high inertia of the output load to which the member 57 is connected, this engagement of the input tooth member to the member 57 will produce a sudden deceleration of the latter and the associated armature 45 and input member 20. If there were a direct connection between pulley 10 and input member 20, and the pulley 10 were being driven at relatively high speed, this suddenly applied load could cause the input to the member 55 to be thrown back in a disengaging direction, and it is even possible that this condition might continue repetitiously, making engagement of the clutch and take-up of the load uncertain.

However, with the present construction the input to the member 55, together with armature 45 and input member 20, are permitted to decelerate when the load is applied, since the resilient connection provided by spring 25 will permit a limited relative movement between the input pulley 10 and input member 20. In practice a relative movement of about ten revolutions has been found satisfactory, although of course this relative movement may be varied to meet with different requirements. Of course during this interim the spring 25 is storing energy and tending to exert an accelerating force through the engaged clutch teeth to the load, and this will result in proper take-up and acceleration of the load without the undesirable clashing or repetitious engagement of the clutch teeth.

The construction provided by this invention permits the use of relatively light weight members for the driving teeth and associated mountings, with accompanying saving in cost and reduced power requirement for the operating electromagnet or other power device used to control the clutch. It should be understood, furthermore, that the above description of input and output members is relative only, having been applied to the preferred illustrated embodiment. It is possible, of course, to have a drive input through member 17 and an output through member 20 and the resilient connection 25, using the pulley 10 as an output. The operation of the device will be essentially the same, since the relatively light weight tooth member 55 and associated mounting, armature and other parts can be accelerated momentarily, remaining effectively independent of the output load on pulley 10 until the spring member 25 stores sufficient energy to accelerate the pulley and associated output load.

Fig. 3 shows a modified form of clutch in accordance with the invention, wherein the input to the clutch is through a double groove sheave 110 secured to a cup-shaped member 111 which may be fixed by brazing at 112, or in any other suitable manner, to a carrier sleeve 114 which is mounted on the outer races of a pair of ball bearings 115. The inner races of these bearings in turn are supported on an output member or spindle 117, held in place by a snap ring 118 and separated by a further snap ring 119. Surrounding carrier sleeve 114, and mounted in freely rotatable relation thereon, is a cup-shaped input member 120 which is confined against axial movement on sleeve 114 by a retaining ring 121.

The drive connection between member 111 and input member 120 is provided by a spirally wound band spring 125 which is secured at opposite ends to these members in substantially the same fashion as shown in Fig. 2, in connection with the previously described embodiment. Spring 125 thus provides a resilient connection of limited travel between the input sheave 110 and the input member 120.

The electromagnetic clutch operator includes an outer two-piece housing 130 which serves to define the flux field, extends in surrounding relation to one end of input member 120, projecting axially therefrom around, and spaced radially outwardly from the output member 117. The housing 130 is preferably secured to a plate 131 which may be suitably supported to prevent rotation thereof. Within housing 130 there is a field coil 132 having a suitable input connection 133 for connection with an electrical energizing source. In a typical construction this coil may be energized by a 12 volt D.C. source and may consume approximately 35 watts of power.

The armature or control member 145 is also of generally cup-shape, having substantially the same outer diameter as input sleeve 120, and being received within the magnet housing 130. The armature includes a central opening 146 through which the output member 117 extends, and this armature is supported to rotate with the input member 120 by a plurality of pins 148 which are press fit at one end into input member 120, and which are received in sliding relation within holes 149 in the armature. Release springs 153 (one shown) engage the face of input member 120 and are received within holes 154 in the opposing face of armature 145, providing a bias which normally urges the clutch to a disengaged position.

The clutch parts are provided by input teeth 155 formed in the face of armature 145, and mating output teeth 156 in a ring 157 which is suitably secured to the output member 117 by a radially extending pin 158. Thus, when the electromagnet is energized armature 145 will move to the right as viewed in Fig. 3, against the bias of springs 153, and the clutch teeth will be engaged to provide the driving connection.

Output member 117 includes a tapered bore 160 provided with a key slot 162, and receiving a complementary tapered shaft 165 of the load to be driven. This shaft includes a keyway 166 for receiving a driving key 168, and further includes a tapped bore 170 at its outer end which receives the bolt 172 extending through output member 117. This bolt also extends through a connecting sleeve 175 having an enlarged head engaging a shoulder 176 in the end of input member 117, thus retaining the input member and shaft 165 in driving relation.

Operation of this modified construction is substantially as described in connection with the clutch shown in Figs. 1 and 2. Thus, with sheave 110, spring 125, and input member 120 rotating at relatively high speed, and armature 145 also rotating therewith, energization of the electromagnetic operator through a suitable control will cause armature 145 to shift to the right, engaging the clutch teeth. This will result in sudden deceleration of the armature and input member 120, due to the relatively high inertia of the load connected to shaft 165. However, the resilient connection provided by spring 125 will afford sufficient relative movement between the sheave 110 and input member 120 to permit the armature and input member 120, which have relatively low inertia (being of lightweight construction) to decelerate for a sufficient interval permitting engagement of the clutch teeth without undesirable clashing or repetitious engagements thereof.

While the form of apparatus herein described constitutes a preferred embodiment of the invention, it is to be understood that this invention is not limited to this precise form of apparatus, and that changes may be made therein without departing from the scope of the invention which is defined in the appended claims.

What is claimed is:

1. An electromagnetic clutch comprising a driven member including driven clutch teeth and having means for connection to a load having relatively great inertia, a relatively lightweight armature, driving teeth on said armature, means supporting said armature for relative movement with respect to said driven member to engage and disengage said teeth, a driving member, means supporting said driving member in rotatable relation coaxially upon said driven member, a sleeve supported between said driving member and said driven member and rotatable with respect to each of said driving and driven members, means forming a slidable torque transmitting connection between said sleeve and said armature, a spiral spring connected at one end to said driving member and at its other end to said sleeve providing a resilient connection between said sleeve and said driving member for limited relative rotation therebetween, and an electromagnet mounted in stationary position about said armature and said sleeve for controlling movement of said armature to engage said clutch therewith.

2. In a clutch adapted to be mounted upon a shaft or the like and to accelerate a load having a relatively great inertia, the combination of a spindle including means for mounting the same upon the shaft, a sleeve member rotatively mounted coaxially of said spindle, a pulley including a rotatable mounting also extending coaxially of said spindle, a resilient connection between said pulley and said sleeve providing for limited relative rotation therebetween, an armature extending around said spindle and having a torque transmitting connection with said sleeve providing for relative movement between said armature and said sleeve, means normally biasing said sleeve and said armature apart from each other, toothed members on said armature and said spindle engageable to provide a controllable clutch connection, and an electromagnet mounted in operating relation with said armature for controlling the movement thereof to advance said armature against said biasing means and to engage said clutch upon energization of said electromagnet.

3. An electromagnetic clutch comprising a spindle adapted for mounting on a shaft, a sleeve mounted in rotatable relation coaxially of said spindle, a pulley having a rotatable mounting also extending coaxially of said spindle, means forming a resilient connection between said pulley and said sleeve providing for limited relative rotation therebetween, an armature supported for axial movement toward and away from said sleeve, means providing a torque transmitting connection between said sleeve and said armature, toothed members on said spindle and said armature cooperable to provide a clutch having engaged and disengaged positions, and an electromagnet mounted in surrounding relation to said armature and operable to control movement thereof relative to said spindle for controlling the operation of said clutch.

4. In a clutch adapted to be mounted upon a shaft or the like and to accelerate a load having a relatively great inertia, the combination of a spindle including means for mounting the same upon the shaft, a sleeve member rotatively mounted coaxially of said spindle, a pulley including a rotatable mounting also extending coaxially of said spindle, a resilient connection between said pulley and said spindle providing for limited relative rotation therebetween, a control member extending around said spindle and having a torque transmitting connection with said sleeve providing for relative movement between said control member and said sleeve, means normally biasing said sleeve and said control member apart from each other, toothed members on said control member and said spindle engageable to provide a controllable clutch connection, and operator means arranged to produce movement of said control member relative to said sleeve for engaging said teeth against said biasing means.

5. An electromagnetic clutch comprising a spindle adapted for mounting on a shaft, a sleeve mounted in rotatable relation coaxially upon said spindle, a power transmitting member also rotatably mounted in coaxial relation on said spindle, means forming a resilient connection between said member and said sleeve providing for limited relative rotation therebetween, an armature supported for axial movement toward and away from said sleeve, means providing a torque transmitting connection between said sleeve and said armature, tooth members on said spindle and said armature cooperable to provide a clutch having engaged and disengaged positions, and an electromagnet mounted in surrounding relation to said armature and operable to control movement thereof relative to said spindle for controlling the operation of said clutch.

References Cited in the file of this patent

UNITED STATES PATENTS

| 2,703,378 | Harter | Mar. 1, 1955 |
| 2,722,846 | McDonald | Nov. 6, 1955 |

FOREIGN PATENTS

| 116,920 | Austria | Mar. 25, 1930 |
| 541,443 | Italy | Mar. 29, 1956 |